United States Patent [19]

Speigel et al.

[11] 4,313,841

[45] Feb. 2, 1982

[54] PROCESS OF CLEANING UNWANTED FILMS

[76] Inventors: Alan B. Speigel, 1700 Harmon St., Apt. 102, Norfolk, Va. 23518; Robert P. Zurich, 18 Wister Pl., Matawan, N.J. 07747

[21] Appl. No.: 67,191

[22] Filed: Aug. 17, 1979

Related U.S. Application Data

[63] Continuation-in-part of Ser. No. 877,567, Feb. 13, 1978, abandoned, which is a continuation of Ser. No. 687,159, May 17, 1976, abandoned, which is a continuation of Ser. No. 375,675, Jul. 2, 1973, abandoned.

[51] Int. Cl.$^3$ .................. C23G 5/02; C11D 7/50; C09D 9/04
[52] U.S. Cl. .................. 252/170; 252/153; 252/162; 252/172; 252/173; 252/DIG. 10; 252/DIG. 14; 134/38; 134/39; 134/40; 134/26; 106/13
[58] Field of Search .............. 252/DIG. 10, DIG. 14, 252/170, 162, 172, 173, 153; 134/38, 39, 40, 26; 106/13

[56] References Cited

U.S. PATENT DOCUMENTS

| | | | |
|---|---|---|---|
| 1,287,589 | 12/1918 | Lewis | 252/170 |
| 2,292,097 | 8/1942 | Vollmer | 106/13 |
| 2,611,747 | 3/1950 | Heideman | 252/170 |
| 3,193,507 | 7/1965 | Jacobs | 252/DIG. 10 |
| 3,354,089 | 11/1967 | York | 134/40 |

FOREIGN PATENT DOCUMENTS 288206 11/1969 U.S.S.R. ...................... 252/170

Primary Examiner—Mayer Weinblatt
Attorney, Agent, or Firm—Bacon & Thomas

[57] ABSTRACT

A method for removing unwanted films from surfaces is described in which the unwanted film is first dissolved in a suitable composition, the properties of the composition then changes so that the dissolved, unwanted film no longer remains soluble in the composition and comes out of solution in a form that cannot redeposit on the surface, and finally, the excess composition and precipitated film components are removed from the surface.

5 Claims, 1 Drawing Figure

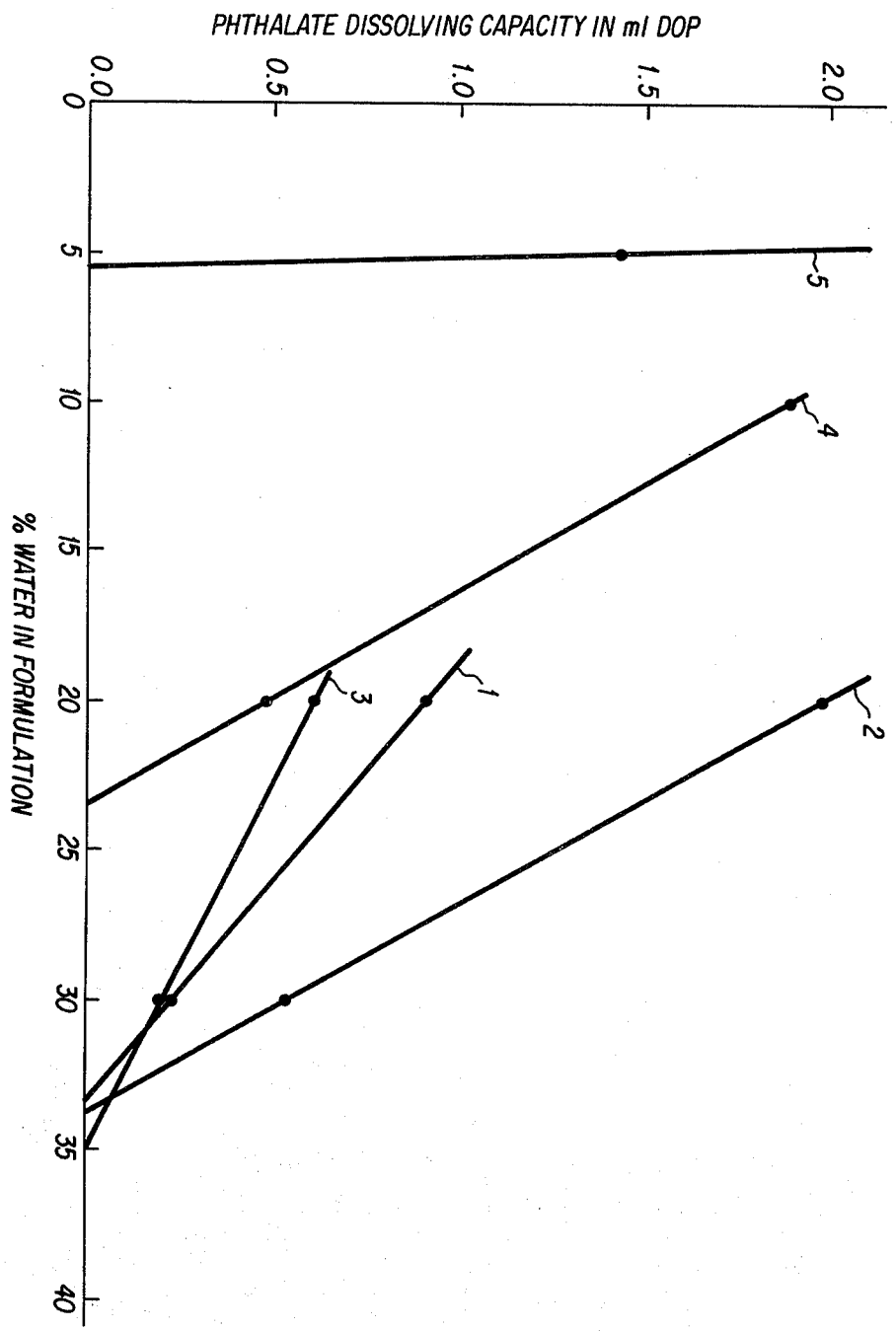

PROCESS OF CLEANING UNWANTED FILMS

CROSS REFERENCES TO RELATED APPLICATIONS

This application is a continuation-in-part application of copending application Ser. No. 877,567, filed Feb. 13, 1978, now abandoned which is a continuation of copending application Ser. No. 687,159, filed May 17, 1976, now abandoned, which is in turn a continuation of copending application Ser. No. 375,675, filed July 2, 1973, now abandoned.

BACKGROUND OF THE INVENTION

1. Field of the Invention

This invention relates to a method of and compositions for removing films from hard surfaces, such as glass surfaces. In particular, this invention relates to the removal of films formed by plasticizers and the like materials which accumulate on interior glass window surfaces and impair visibility. Such films are particularly hazardous to drivers of motor vehicles as dust and tobacco smoke particles embedded in the film cause a glare which obstructs the driver's view. This is particularly true at night when the light source is the headlights of an approaching motor vehicle, or when the sun is at a low elevation and in the driver's eyes.

2. Description of the Prior Art

Various compositions and methods for cleaning surfaces, and in particular, glass surfaces have been described in the prior art. U.S. Pat. No. 3,354,089 describes a windshield washing composition which when applied to wet strengthened paper wipers, cleans the glass surfaces and deposits an invisible yet dirt-adhesion resistant film. This patent also points out that the detergent chemicals used in the cleaning composition must not leave a visible or light diffracting film obstructing the driver's visibility. It is also clear from the patent that the glass surface exterior to the driver is being cleaned.

A windshield cleaning composition having as an essential ingredient an amine and having particular utility for cleaning automobile windshields is described in U.S. Pat. No. 3,309,321. This patent describes that it is well known to those who operate automobiles that a scum or film can form on automobile windshields which will obscure the vision. One of the components of this film or scum is said to be dibutyl phthalate which is believed to be deposited on the windshield from the wiper blade. Dibutyl phthalate is a plasticizer contained in the wiper blade. Again, it is clear that the surface of the windshield exterior to the driver is being described.

U.S. Pat. No. 2,611,747 discloses a windshield cleaning composition containing an alcohol or ketone, and naphthalene. It is clear from the disclosure that the cleaner is an aqueous solution, i.e., a solution containing not less than 50% water, and that the organic components of the solution do not exceed 26%.

U.S.S.R. Inventors Certificate 288,206 teaches a windshield solution containing acetone, isoamyl acetate, ethyl alcohol, and a small amount of nonvolatiles. Again, it is clear from the text that the cleaner is an aqueous solution containing no more than 9.5% organic solvents, the balance being water.

The glass cleaning compositions cited above, in addition to several commercially available window cleaners whose compositions are representative of the liquid glass cleaners marketed today were tested for their phthalate dissolving capacities (see Table 2A), and for their glass cleaning effectiveness (see Tables 4B and 4C). It was found that both the commercially available cleaners and the prior art compositions could not dissolve any phthalate plasticizers at all, and that they leave an undesirable haze on the glass surface when used to clean phthalate films from glass test panels.

Thus, at the present time, no commercial cleaners or prior art compositions can remove phthalate films from the interior surfaces of automotive window glass without leaving an undesirable haze thereon.

SUMMARY OF THE INVENTION

The present invention is directed to a method and composition for removing an unwanted surface film from a surface. The method comprises applying a cleaning composition comprising a mixture of at least one solvent for the unwanted film and at least one nonsolvent, the solvent having a higher vapor pressure than the nonsolvent, to a hard surface to be cleaned to first dissolve the unwanted film either by simple solvation or by chemical reaction and solvation of the reaction products, changing the properties of the cleaning composition so that the dissolved, unwanted film no longer remains soluble in the cleaning composition and precipitates from solution in a form that does not redeposit on the hard surface, and removing excess cleaning composition and and the precipitated unwanted film from the surface.

Another object of the present invention is to provide a glass cleaning composition and a glass cleaning method, and specifically, a cleaning composition and a cleaning method that can remove the visibility-impairing phthalate film from the interior surfaces of motor vehicle window glass without leaving a haze and without damage to the glass surfaces, upholstery, interior finishes, or without irritating the skin. This is accomplished by the method of removing films from surfaces wherein the film is dissolved in a cleaning composition, the properties of the composition change so that the film precipitates in a form that cannot redeposit on the surface, and then the precipitated film and excess cleaning composition are removed from the surface.

The glass cleaning composition may conveniently be contained in a sealed disposable packet containing a disposable applicator swab soaked with the composition of the invention.

BRIEF DESCRIPTION OF THE DRAWING The FIGURE is a graph which shows the relationship of the phthalate dissolving capacity of each formulation to the percent water in the formulation.

DESCRIPTION OF THE PREFERRED EMBODIMENTS

One condition that has been recognized as contributing to the hazards of driving is the visibility impairing film formed from phthalate plasticizers, low molecular weight polymers and the like volatiles that are vaporized from various polymeric materials now used in the interiors of motor vehicles. This vaporization occurs most copiously during warm months and leaves the interior surfaces of the vehicle's window glass covered with a sticky film that traps dust and tobacco smoke particles and thus reduces visibility. This film presents a particular hazard during night driving against approaching headlights because the embedded dirt particles diffract and scatter incoming light causing an intense glare over the entire windshield until the approaching car passes. This momentary flare of scattered light can leave a driver with impaired visibility for several minutes until his eyes reajust to the normally low light levels.

From the pertinent literature, it has been determined that the windshield film consists mostly of phthalate plasticizers and smaller amounts of thermally degraded plasticizers and polymeric materials. Moisture, dust and tobacco smoke particles are also present.

It was then determined that an acceptable cleaning composition must exhibit the following properties:
1. It must remove the unwanted phthalate film from the interior glass surfaces; this means the composition must remove phthalates, thermally degraded material, moisture, and dust and smoke particles.
2. It must not contain any component that remains behind on the cleaned glass surface that would serve as a new sticky film to entrap dust or smoke particles.
3. It must clean the glass surface in a minimum amount of time and with a minimum amount of wiping and polishing.
4. Any excess composition must be easily and quickly removed from the surface by a combination of wiping and evaporation.
5. It must not harm the glass surfaces, upholstery, interior finishes, or irritate the skin of the user.

A choice of cleaning composition components was then made consistent with the preceding requirements. It was determined that the major component of the glass cleaning composition should consist of phthalate solvents rather than water, a phthalate non-solvent.

The solvents used in the glass cleaning formulation must also have high vapor pressures so that they will rapidly evaporate from the cleaned surface and be commercially available in suitable purites so that they would reliably contain no non-volatile residues and also be miscible with any moisture present in the phthalate film to be removed from the glass surface. Particular phthalate solvents that meet these requirements include acetone, methylethylketone, ethyl acetate, isopropyl alcohol acetate, and isopropyl.

However, it was found that while cleaning compositions consisting of these solvents alone removed the unwanted film from windshields and artificial films made by depositing commercial phthalates on glass test panels the solvent always left behind a milky haze on the glass surface. It was determined that the reason for this is that when solvents alone are used to clean phthalates from glass surfaces, the phthalate dissolves completely in the solvent and forms a dilute solution and some of this solution is always left behind on the glass surface. When this dilute solution evaporates the small amount of phthalate remains behind to form the undersirable haze.

In determining the solubility of diisooctyl phthalate, a phthalate commonly used in automobile upholstery, it was noted that the diisooctyl phthalate was completely insoluble in water and upon shaking, formed a cloudy suspension. When this suspension was left undisturbed it coalesced into larger droplets, some of which clung to the sides of the glass container. These phthalate droplets evidently did not wet the glass surface, however, because they could be easily dislodged by gentle swirling of the liquid.

This observation led to a successful method for removing the phthalate film from the interior surface of auto glass without leaving a haze of residue, and can serve also as a general method for removing any unwanted film from any surface without leaving behind a residue of the film.

In the specific case of the phthalate film on glass, an effective cleaning composition will consist of a mixture of miscible, phthalate solvents and non-solvents. The phthalate solvents are selected so that they have higher vapor pressures than the non-solvents. They also must be initially present in high enough concentrations so that when the cleaning composition consisting of both phthalate solvents and non-solvents is applied to the glass surface it readily dissolves the phthalate film. As the cleaning composition is applied in a thin layer to the glass, however, the higher vapor pressure phthalate solvents begin to evaporate faster than the lower vapor pressure phthalate non-solvents, with the result that the concentration of the phthalate solvents in the cleaning composition on the glass decreases and continues to decrease until eventually a concentration is reached where the dissolved phthalate film is no longer soluble in the composition left on the glass and comes out of solution as a fine suspension that does not redeposit on the glass surface. The suspension may then be readily removed from the glass.

In formulating the cleaning composition of this invention, various combinations of the phthalate solvents listed in Table 1 were prepared with water as the non-solvent. These phthalate solvents all exhibit high vapor pressures and are compatible with water. Isopropyl alcohol is present in the formulations because it is especially effective in lowering the surface tension of the cleaning composition, thus making it easier to wet the glass, and because it is the least damaging of all the alcohols to automobile finishes.

TABLE 1

| | Evaporation* Rate (BuAc = 1) | Vapor Pressure (mm Hg at 21° C.) | Water Solubility (% water in solvent) |
| --- | --- | --- | --- |
| Acetone | 7.7 | 169.0 | complete |
| Methylethylketone | 4.6 | 80.48 | 12.5% |
| Ethyl Acetate | 4.2 | 68.39 | 3.3% |
| Isopropyl Acetate | 3.0 | 47.80 | 1.8% |
| Isopropanol | 1.7 | 33.17 | complete |

*The evaporation rate was measured against Butyl Acetate

Water, which may be distilled, with a vapor pressure at 21° C. of only 18.65 mm of Hg, is preferred as the miscible phthalate non-solvent not only because its vapor pressure is well below that of the phthalate solvents as required, but also because it is inert, and would thus help prevent damage to finishes, upholstery, and skin by the phthalate solvents, and most importantly, because it is a highly polar molecule. As the phthalate film dissolves in the cleaning composition, it leaves the glass surface and allows the highly polar water molecules to form a strong dipole-dipole attraction with the polar hydroxyl groups on the glass surface. This tightly attracted water layer helps prevent the phthalate suspension from redepositing on the glass when the phthalate comes out of solution. In other words, it is preferred to have a non-solvent which is adsorbed more strongly by the hard surface than is the unwanted film or substance to be removed.

As explained, the higher vapor pressure of the phthalate solvent causes the phthalate solvent to evaporate faster than the lower vapor pressure non-phthalate solvents. There is no specific requirement as to how much faster the solvent must evaporate compared to the non-solvent. The closer the evaporation rates (or vapor pressures) are, the longer it takes the solvent component to evaporate to the point that saturation and precipitation occur.

The necessary selection of vapor pressure, i.e., evaporation rate, differential may be readily determined by one of ordinary skill in the art without undue experimentation as is evident from the formulations contained herein.

For example, a formulation might purposely be chosen with solvent and non-solvent vapor pressures close together so that the cleaning composition will be in contact with the surface a long time before the evaporation of the solvent causes saturation and precipitation. This would allow a longer time for the cleaning component, i.e., solvent, to work on a stubborn film. However, it is necessary that the vapor pressure/evaporation rate of the solvent be greater than the vapor pressure/evaporation rate of the non-solvent.

In accordance with the method of the present invention, a cleaning composition capable of dissolving the unwanted film either by simple dissolution or by chemical reaction and dissolution of the reaction products is first applied to a surface containing the film to be dissolved. The properties of the cleaning solution are then altered preferably by simple evaporation, so that the dissolved film does not remain soluble and comes out of solution in a form that does not redeposit on the surface. Finally, the excess cleaning composition and the precipitated film are removed from the surface leaving a clean, haze free surface.

Five different formulations of the cleaning composition were prepared, each formulation at two different concentrations of the main phthalate solvent (percent by volume):

| | #1 | #2 |
|---|---|---|
| Acetone - Isopropanol - Water Formulation | | |
| Acetone | 50% | 40% |
| Isopropanol | 30% | 30% |
| Water | 20% | 30% |
| Methylethylketone - Isopropanol - Water Formulation | | |
| MEK | 50% | 40% |
| Isopropanol | 30% | 30% |
| Water | 20% | 30% |
| Ethyl Acetate - Isopropanol - Water Formulation | | |
| Ethyl acetate | 50% | 40% |
| Isopropanol | 30% | 30% |
| Water | 20% | 30% |
| Acetone - Ethyl Acetate - Water Formulation | | |
| Acetone | 60% | 50% |
| Ethyl acetate | 30% | 30% |
| Water | 10% | 20% |
| Methylethylketone - Ethyl Acetate - Water Formulation | | |
| MEK | 68% | 65% |
| Ethyl acetate | 30% | 30% |
| Water | 2% | 5% |

Ten milliliters of each of these formulations was tested to determine how much diisooctyl phthalate (DOP) it could dissolve before a suspension formed, indicating saturation. In addition, ten milliliters of two of the prior art compositions were tested along with three commercially available window cleaners. The results are shown in Tables 2A and 2B.

By plotting the volume of the phthalate dissolved at the saturation point against the percent water in the experimental formulation (Table 2B), and extrapolating to the abscissa, the upper limit of water at which the formulation will remain miscible and still dissolve phthalate can be calculated. Exceeding this limit will result in a composition which will be incapable of dissolving any phthalate at all, making it useless as a cleaner. In fact, in practice, it is advisable to formulate below this upper water limit so that the composition is capable of dissolving significant amounts of phthalate before saturation occurs.

TABLE 2A

| | | Phthalate dissolving capacity in ml DOP |
|---|---|---|
| 1. | Commercial Cleaner #1 | 0.00 ml (not miscible) |
| 2. | Commercial Cleaner #2 | 0.00 ml (not miscible) |
| 3. | Commercial Cleaner #3 | 0.00 ml (not miscible) |
| 4. | USSR #288,206 | 0.00 ml (not miscible) |
| 5. | Heideman U.S.P. 2,611,747 | 0.00 ml (not miscible) |

TABLE 2B

| | Phthalate dissolving capacity in ml DOP |
|---|---|
| 1. Acetone-Isopropanol-Water | |
| 30% water | 0.22 ml |
| 20% water | 0.91 ml |
| 2. MEK-Isopropanol-Water | |
| 30% water | 0.63 ml |
| 20% water | 1.98 ml |
| 3. Ethyl Acetate-Isopropanol-Water | |
| 30% water | 0.20 ml |
| 20% water | 0.61 ml |
| 4. Acetone-Ethyl Acetate-Water | |
| 30% water | 0.00 ml (not miscible) |
| 20% water | 0.48 ml |
| 10% water | 1.89 ml |
| 5. MEK-Ethyl Acetate-Water | |
| 30% water | 0.00 ml (not miscible) |
| 20% water | 0.00 ml (not miscible) |
| 10% water | 0.00 ml (not miscible) |
| 5% water | 1.43 ml |
| 2% water | 11.1 ml |

The results of the testing described above is shown in the graph of the FIGURE, and the upper limits of water for each formulation is given in the following Table 3.

TABLE 3

| Formulation | Upper Limit % Water |
|---|---|
| Acetone - Isopropanol - Water (1) | 33% |
| MEK - Isopropanol - Water (2) | 34% |
| Ethylacetate - Isopropanol - Water (3) | 35% |
| Acetone - Ethyl Acetate - Water (4) | 23% |
| MEK - Ethyl Acetate - Water (5) | 5.4% |

As can be clearly seen from Table 3, the calculated upper water limits show that an effective cleaning composition for phthalates cannot be an aqueous solution. The highest water content that can be tolerated is 35%; above that the formulation is incapable of dissolving phthalates.

The acetone-isopropanol-water formulation No. 2 was used to demonstrate the phthalate-removing ability of this type of cleaning composition. In this test, 0.10 ml of diisooctyl phthalate was added to 25 ml of the acetone-isopropanol-water formulation No. 2. The mixture was agitated briefly, transferred to a glass evaporating dish, and kept at room temperature (72° F.). After approximately three hours of evaporation, the clear solution had turned milky and opaque indicating that enough of the phthalate solvents, acetone and isopropyl alcohol, had evaporated so that the diisooctyl phthalate, previously soluble in the cleaning composition, was now incapable of being held in solution and was coming out as a fine suspension in the remaining liquid. This suspension was easily adsorbed with a paper towel and the glass surface could be wiped clean with no diisooctyl phthalate residue remaining on the glass; 0.10 ml of diisooctyl phthalate placed by itself in a second glass evaporating dish could not be completely removed from the glass by wiping with a paper towel.

The cleaning effectiveness of three of the formulations, three popular commercial cleaners, and two prior art compositions was next tested by using each cleaner to clean an artificial phthalate film from an 11×14 inch glass test plate. The artificial film was created by first making up a 4% solution of a commercial phthalate in acetone; 2.00 ml of this solution was then spread over the glass test plate and the acetone allowed to evaporate. The remaining thin film of phthalate was baked onto the glass at 150° F. for a half hour. A commercial white paper towel swab, 6×9 inches in area, was then saturated with the cleaner being tested and used to remove the artificial film from the test panel. After cleaning, the panel was visually inspected to determine whether the phthalate film was completely removed and whether the cleaner left a residual haze on the plate.

Each cleaner was tested against five different artificial phthalate films composed of the following commercial plasticizers, respectively:
COP: di-2-ethylhexyl phthalate
DIOP: diisooctyl phthalate
DIDP: diisodecyl phthalate
DOS: di-2-ethylhexyl sebacate
DOZ: di-2-ethylhexyl azelate The first three of these phthalates account for approximately 50% of all plasticizers used in automotive interiors. The last two are the most frequently used in low temperature applications such as automobile upholstery. The results of the cleaning effectiveness test are shown in Tables 4A, 4B, and 4C.

TABLE 4A

| | Acetone-Isopropanol Water #1 | | Acetone-Isopropanol Water #2 | | MEK-Isopropanol Water #1 | |
|---|---|---|---|---|---|---|
| | film removal | residual haze | film removal | residual haze | film removal | residual haze |
| DOP | C | N | C | S | C | S |
| DIOP | C | N | C | S | C | VS |
| DIDP | C | N | C | VS | C | VS |
| DOS | C | S | C | VS | C | S |
| DOZ | C | S | C | VS | C | S |

C - Complete
P - Partial
N - None
VS - Very slight; cannot be seen by light transmitted through the glass plate, can be seen only with great difficulty by reflected light from the cleaned surface; appears only in small patches and is virtually invisible
S - Slight; cannot be seen by light transmitted through the glass plate; can be barely seen by reflected light from the cleaned surface
M - Moderate; can barely be seen by transmitted light; can be readily seen by reflected light from the cleaned surface
H - Heavy; can be readily seen by both transmitted and reflected light; a point light source appears as a "star" when viewed through the glass
VH - Very heavy; very apparent haze left on the surface because of incomplete film removal

TABLE 4B

| | Commercial Cleaner #1 | | Commercial Cleaner #2 | | Commercial Cleaner #3 | |
|---|---|---|---|---|---|---|
| | film removal | residual haze | film removal | residual haze | film removal | residual haze |
| DOP | C | H | P | VH | C | M |
| DIOP | C | M | C | H | C | M |
| DIDP | C | M | C | M | C | H |
| DOS | C | M | C | H | C | M |
| DOZ | C | H | P | VH | C | M |

TABLE 4C

| | USSR 288,206 | | Heideman 2,611,747 | |
|---|---|---|---|---|
| | film removal | residual haze | film removal | residual haze |
| DOP | C | M | C | M |
| DIOP | C | M | C | M |
| DIDP | C | M | C | M |
| DOS | C | M | C | M |
| DOZ | C | M | C | M |

As can be seen from Tables 4A, 4B and 4C, while all the compositions removed the film, only the compositions in accordance with the present invention were sufficiently effective to remove the haze residue. A moderate (M) rating for the residual haze is not acceptable and the composition is not within the scope of the claimed invention. It is only with the compositions of the present invention that haze removal is within the acceptable range of from slight (S) to very slight (VS).

The three aqueous commercial cleaners and the two prior art compositions, in addition to not cleaning as effectively as the three organic experimental cleaning formulations, required an unacceptably long time (8 to 10 minutes) to evaporate with wiping from the surface of the glass test plate. The experimental formulations, on the other hand, besides cleaning more effectively than the other compositions, required only 35 to 45 seconds to clean and evaporate completely from the surface of the glass plate.

The three experimental formulations were next tested to determine their effect on vinyl auto upholstery. Three 2½×3 inch absorbent pads were saturated with each of the three formulations and placed on a strip of vinyl upholstery. They were left undisturbed until the pads were completely dry; the pads were then removed and the vinyl surface inspected.

The acetone containing formulations caused a very slight loss of surface sheen and a very slight puckering of the vinyl material. The MEK formulation caused moderate loss of surface sheen and moderate puckering. Wiping the vinyl surface with a commercial wax cleaner restored the lost sheen in all cases but did not eliminate the puckering which appeared to be permanent. However, the puckering caused by the acetone containing formulations was so slight as to be nearly invisible after the vinyl surface had been wiped with the wax cleaner.

Finally, the three formulations were tested for skin irritation by having subjects immerse their fingers of one hand in four successive beakers containing the acetone-isopropanol-water formulation Nos. 1 and 2, and the MEK formulation No. 1, as well as distilled water in an order unknown to the subjects. Each subject was asked to immerse his fingers in the solution for 15 seconds, record his impression on a scale ranging from 1.0 (irritating) to 5.0 (neutral) to 9.0 (pleasant), add any remarks he felt appropriate, dry his fingers, and go on to the next beaker.

A sample group of eight subjects tested the four solutions. The range and average rank given each formulation and the water sample are shown in Table 6.

TABLE 6

|  | Range | Average Rank |
|---|---|---|
| Acetone-Isopropanol-Water Formulation #1 | 3.0–9.0 | 5.6 |
| Acetone-Isopropanol-Water Formulation #2 | 4.0–9.0 | 6.0 |
| MEK Formulation #1 | 2.5–9.0 | 5.7 |
| Distilled Water | 4.0–9.0 | 5.5 |

The subjects tended to rank water slightly higher than neutral (5.0) and tended to rank the three formulations slightly higher, that is, more pleasant to the touch than water. From the written remarks it was also noted that each of the formulations gave a slight stinging sensation if the subject had small cuts on the finger.

As can be seen from these examples, various compositions may be utilized in the method of the present invention. These compositions also form part of the invention and include a hard surface cleaning composition composed of a mixture of two components, the first component being a solvent for the substance to be removed from the surface and having an evaporation rate from the cleaning composition greater than that of the second component, the second component being a non-solvent for the substance to be removed from the surface; the two components further being miscible in each other, and also with the first component present in a high enough concentration so that the substance to be removed from the hard surface is soluble in the cleaning composition as a whole. The first component (solvent) may be either a single solvent or a mixture of solvents, and the second component is either a single non-solvent or a mixture of non-solvents. However, the first component (solvent) has a vapor pressure greater than that of the second component and preferably, the second component (non-solvent) is adsorbed more strongly by the hard surface than the substance to be removed.

The above compositions include those in which the first component is a mixture of a ketone and an alcohol, and the second component is water. The first component may be a mixture of acetone and isopropanol, and the second component is water, present in a concentration (percent by volume) not greater than 33%.

Also effective is a composition in which the first component is a mixture of methylethylketone and isopropanol, and the second component is water, present in a concentration (percent by volume) not greater than 34%.

Esters may also be used as a solvent as can be seen from the above formulation in which the first component is a mixture of an ester and an alcohol, and the second component is water. Specifically, the first component is a mixture of ethyl acetate and isopropanol, and the second component is water, present in a concentration (percent by volume) not greater than 35%. Also effective are the compositions in which the first component is a mixture of a ketone and an ester and the second component is water. For example, the composition in which the first component is a mixture of acetone and ethyl acetate, and the second component is water, present in a concentration (percent by volume) not greater than 23%.

The amount of water in the compositions is less than 50%. In the components in which the first component is a mixture of methylethylketone and ethyl acetate, and the second component is water, the water is present in a concentration (percent by volume) not greater than 5.4%.

While the invention has so far been described in terms of the removal of a phthalate film from the interior of automotive windshields, it is clear that the principles of this invention have wider applicability. For example, the present method may be adopted for the removal of cooking grease and oils from surfaces adjacent to cooking areas where these substances accumulate without leaving behind any undesirable film which may give the surface a dull and uncleaned look. The correct selection of solvents and non-solvents according to the principles already described can be readily determined by one of ordinary skill in the art.

What is claimed is:

1. A method for cleaning an unwanted phthalates containing film from the interior surface of a glass automotive windshield which comprises applying a cleaning composition containing a mixture of a phthalates solvent and nonsolvent wherein said solvent is a mixture of isoproponol and a compound selected from the group consisting of acetone, ethylacetate, and methylethylketone; said nonsolvent is water and said water is present in said mixture in an amount of less than 50%; to the phthalates containing film, allowing sufficient time for said cleaning composition to dissolve said film and for said solvent to preferentially evaporate to cause precipitation in said water of said phthalates in a form which does not redeposit on the glass surface and then wiping away any remaining composition from said surface.

2. The method of claim 1 wherein said phthalates are selected from the group consisting of di-2-ethylhexyl phthalate, diisooctyl phthalate, diisodecyl phthalate, di-2-ethylhexyl sebacate and di-2-ethylhexyl azelate.

3. The method of claim 1, wherein said composition consists of 50% acetone, 30% isopropyl alcohol, and 20% water.

4. The method of claim 1, wherein the composition consists of 40% acetone, 30% isopropyl alcohol, and 30% water.

5. The method of claim 1, wherein the composition consists of 50% methylethylketone, 30% isopropyl alcohol, and 20% water.

* * * * *